United States Patent
Ando (10) Patent No.: US 12,509,087 B2
(45) Date of Patent: Dec. 30, 2025

(54) VEHICLE CONTROL SYSTEM AND VEHICLE

(71) Applicant: SUBARU CORPORATION, Tokyo (JP)

(72) Inventor: Yusuke Ando, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 192 days.

(21) Appl. No.: 18/228,762

(22) Filed: Aug. 1, 2023

(65) Prior Publication Data
US 2024/0051542 A1 Feb. 15, 2024

(30) Foreign Application Priority Data
Aug. 9, 2022 (JP) .................. 2022-126818

(51) Int. Cl.
| | |
|---|---|
| *B60W 30/182* | (2020.01) |
| *B60W 50/08* | (2020.01) |
| *B60W 50/14* | (2020.01) |
| *B60W 60/00* | (2020.01) |

(52) U.S. Cl.
CPC ........ *B60W 30/182* (2013.01); *B60W 50/082* (2013.01); *B60W 50/14* (2013.01); *B60W 60/0053* (2020.02); *B60W 2050/146* (2013.01)

(58) Field of Classification Search
CPC ........... B60W 30/182; B60W 60/0053; B60W 50/082; B60W 50/14; B60W 2050/146
See application file for complete search history.

(56) References Cited

U.S. PATENT DOCUMENTS

| | | | |
|---|---|---|---|
| 2017/0334453 A1 | 11/2017 | Mimura et al. | |
| 2017/0351256 A1* | 12/2017 | Kumakiri | B60W 60/0053 |
| 2019/0152491 A1* | 5/2019 | Arai | B60W 50/082 |
| 2020/0298876 A1* | 9/2020 | Mimura | B60R 16/02 |

FOREIGN PATENT DOCUMENTS

| | | | |
|---|---|---|---|
| JP | 2007196808 A | * | 8/2007 |
| JP | 2017-207885 A | | 11/2017 |

* cited by examiner

*Primary Examiner* — Wade Miles
*Assistant Examiner* — Jerrod Irvin Davis
(74) *Attorney, Agent, or Firm* — TROUTMAN PEPPER LOCKE LLP (57) ABSTRACT

A vehicle control system includes an operation receiving unit and an automatic driving control processor. The operation receiving unit receives an operation at least through an electrical signal. The operation is to be performed by an occupant of a vehicle. The automatic driving control processor performs an automatic driving control of the vehicle, and causes transition from an automatic driving mode to a manual driving mode to be performed in a predetermined case. The automatic driving mode is a driving mode in which the automatic driving control is performed. The manual driving mode is a driving mode in which manual driving based on the operation received by the operation receiving unit is performed. The operation receiving unit has an interface state that is unchanged from a neutral state in a no-operation period in which the operation on the operation receiving unit is not received.

15 Claims, 5 Drawing Sheets

EXAMPLE 1 (IN AUTOMATIC DRIVING MODE M1)

EXAMPLE 1 (IN MANUAL DRIVING MODE M2)

FIG. 1

COMPARATIVE EXAMPLE 1 (IN AUTOMATIC DRIVING MODE M1)

FIG. 2

COMPARATIVE EXAMPLE 2 (IN AUTOMATIC DRIVING MODE M1)

FIG. 3

EXAMPLE 1 (IN AUTOMATIC DRIVING MODE M1)

FIG. 4A

EXAMPLE 1 (IN MANUAL DRIVING MODE M2)

FIG. 4B

EXAMPLE 2 (IN AUTOMATIC DRIVING MODE M1)

FIG. 5A

EXAMPLE 2 (IN MANUAL DRIVING MODE M2)

VEHICLE CONTROL SYSTEM AND VEHICLE

CROSS-REFERENCE TO RELATED APPLICATION

The present application claims priority from Japanese Patent Application No. 2022-126818 filed on Aug. 9, 2022, the entire contents of which are hereby incorporated by reference.

BACKGROUND

The disclosure relates to a vehicle control system configured to control a vehicle, and to a vehicle including such a vehicle control system.

Various techniques are disclosed as a vehicle control system configured to control a vehicle. For example, reference is made to Japanese Unexamined Patent Application Publication No. 2017-207885.

SUMMARY

An aspect of the disclosure provides a vehicle control system including an operation receiving unit and an automatic driving control processor. The operation receiving unit is configured to receive an operation at least through an electrical signal. The operation is to be performed by an occupant of a vehicle. The automatic driving control processor is configured to perform an automatic driving control of the vehicle, and cause transition from an automatic driving mode to a manual driving mode to be performed in a predetermined case. The automatic driving mode is a driving mode in which the automatic driving control is performed. The manual driving mode is a driving mode in which manual driving based on the operation received by the operation receiving unit is performed. The operation receiving unit has an interface state configured to be unchanged from a neutral state in a no-operation period in which the operation on the operation receiving unit is not received.

An aspect of the disclosure provides a vehicle including a vehicle control system. The vehicle control system includes an operation receiving unit and an automatic driving control processor. The operation receiving unit is configured to receive an operation at least through an electrical signal. The operation is to be performed by an occupant of the vehicle. The automatic driving control processor is configured to perform an automatic driving control of the vehicle, and cause transition from an automatic driving mode to a manual driving mode to be performed in a predetermined case. The automatic driving mode is a driving mode in which the automatic driving control is performed. The manual driving mode is a driving mode in which manual driving based on the operation received by the operation receiving unit is performed. The operation receiving unit has an interface state configured to be unchanged from a neutral state in a no-operation period in which the operation on the operation receiving unit is not received.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

It is desired to improve, for example, usability of a vehicle control system.

It is desirable to provide a vehicle control system that makes it possible to improve usability, and a vehicle including such a vehicle control system.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. The description is given in the following order.

Figure 1:
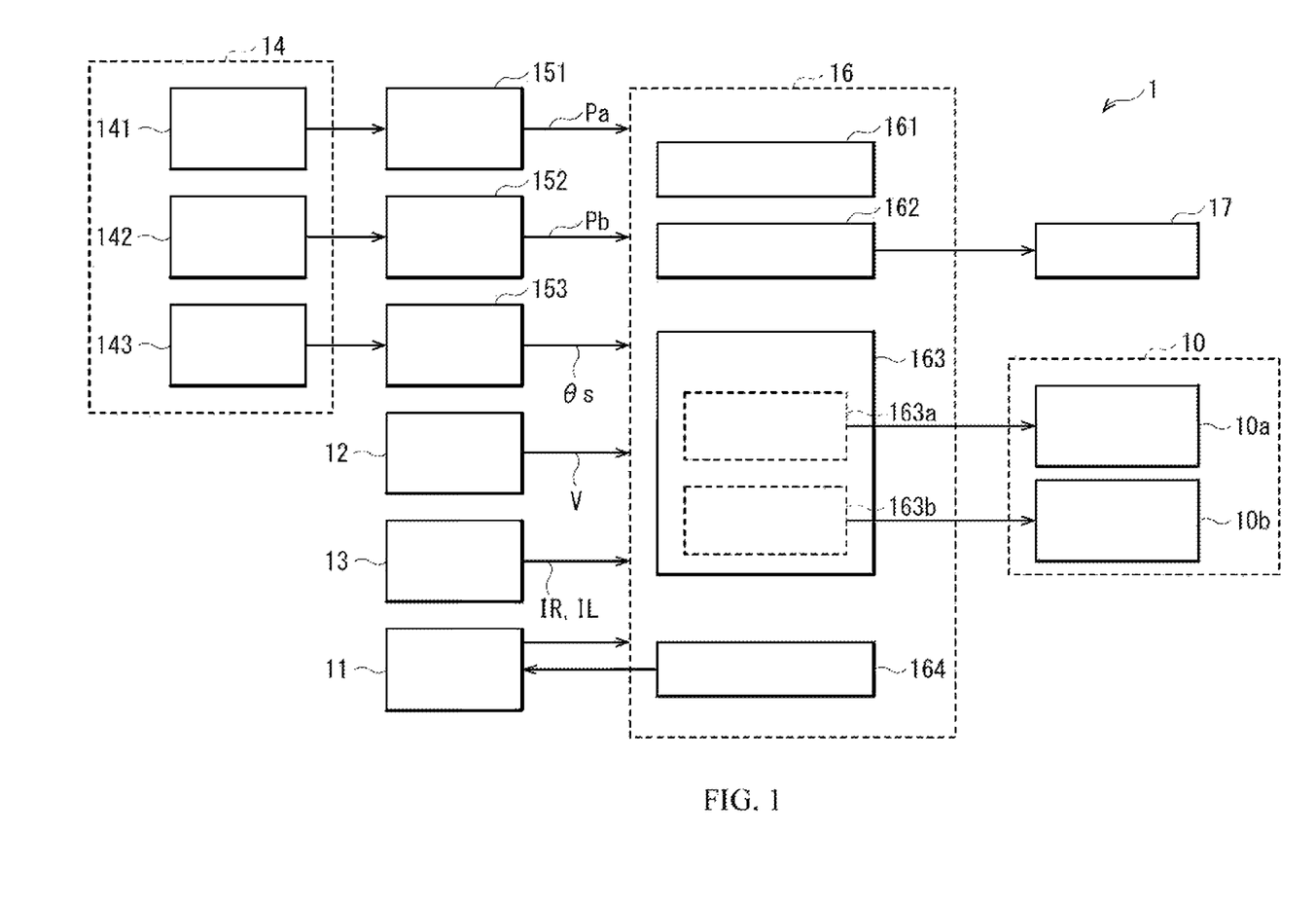
FIG. 1 is a block diagram illustrating a schematic configuration example of a vehicle according to one example embodiment of the disclosure.

FIG. 1 illustrates, in a block diagram, a schematic configuration example of a vehicle (a vehicle 1) according to an example embodiment of the disclosure.

The vehicle 1 may include, for example but not limited to, a driving force source 10, a battery 11, a vehicle speed sensor 12, a stereo camera 13, an operation receiving unit 14, an accelerator pedal sensor 151, a brake pedal sensor 152, a steering angle sensor 153, a vehicle control processor 16, and an information display unit 17.

In one embodiment, the operation receiving unit 14, the vehicle control processor 16, and the information display unit 17 may serve as a "vehicle control system".

As illustrated in FIG. 1, the vehicle 1 may include an engine 10a and a motor 10b as the driving force source 10.

The engine 10a may be an internal combustion engine. The motor 10b may be an electric motor. That is, the vehicle 1 may be configured as a hybrid electric vehicle (HEV) including the engine 10a and the motor 10b as the driving force source 10.

The vehicle 1 may thus have three traveling modes: a hybrid traveling mode using both the engine 10a and the motor 10b as driving force sources; an engine traveling mode simply using the engine 10a as a driving force source; and a motor traveling mode simply using the motor 10b as a driving force source. Depending on, for example, a traveling condition of the vehicle 1, the traveling mode may be switched among the above-described three traveling modes, and the traveling mode to which the switching is performed may be used.

The battery 11 may store electric power to be used in the vehicle 1. For example, the battery 11 may include any of various kinds of secondary batteries including, without limitation, a lithium-ion battery. The battery 11 may store electric power receivable through charging from an outside the vehicle 1, i.e., charged electric power, and may also store, for example, regenerative electric power received from the motor 10b or any other electric power.

The vehicle speed sensor 12 may detect a speed of the vehicle 1, i.e., a vehicle speed V, at a time when the vehicle 1 is traveling. The vehicle speed V detected by the vehicle speed sensor 12 may be supplied to the vehicle control processor 16, for example, to an automatic driving controller 163 or any other unit to be described later, as illustrated in FIG. 1.

The stereo camera 13 may capture an image of a surrounding situation or a traveling environment of the vehicle 1, and detect the surrounding situation or the traveling environment of the vehicle 1. The stereo camera may serve as an imaging device. The stereo camera 13 may include, for example, two cameras, i.e., a right camera and a left camera.

The right camera and the left camera may each include, for example, a lens and an image sensor. For example, the right camera and the left camera may be disposed in the vicinity of an upper portion of a windshield of the vehicle 1, being separated away from each other by a predetermined distance along a width direction of the vehicle 1. The right camera and the left camera may be configured to perform imaging operations in a manner synchronized with each other. In one example, the right camera may generate a captured image IR (a right image), and the left camera may generate a captured image IL (a left image). The captured images IR and IL thus obtained by the stereo camera 13 including the right camera and the left camera may each be supplied to the vehicle control processor 16, for example, to a vehicle recognizer 161, the automatic driving controller 163, or any other unit to be described later.

The information display unit 17 may output or display various kinds of information for an occupant of the vehicle 1. The occupant of the vehicle 1 may be, for example but not limited to, a driver. The information display unit 17 may include, for example, a head-up display (HUD) or any other display.

In one embodiment, the information display unit 17 may serve as an "information output unit". That is, instead of outputting various kinds of information to the outside by displaying, the various kinds of information may be supplied to the outside by any other method such as an audio method.

The operation receiving unit 14 may include an accelerator pedal 141, a brake pedal 142, and a steering wheel 143, as illustrated in FIG. 1. Each of the members, i.e., each of the accelerator pedal 141, the brake pedal 142, and the steering wheel 143, may receive an operation performed by the occupant, such as the driver, of the vehicle 1 at least through an electrical signal, i.e., by a so-called by-wire method.

The accelerator pedal sensor 151 may detect an amount of pressing of the accelerator pedal 141 by the driver of the vehicle 1, i.e., an accelerator position Pa. The brake pedal sensor 152 may detect an amount of pressing of the brake pedal 142 by the driver of the vehicle 1, i.e., a brake pressing amount Pb. The steering angle sensor 153 may detect an amount of an operation performed on the steering wheel 143 by the driver of the vehicle 1, i.e., a steering angle $\theta s$.

Each of the accelerator position Pa, the brake pressing amount Pb, and the steering angle $\theta s$ detected by the accelerator pedal sensor 151, the brake pedal sensor 152, and the steering angle sensor 153, respectively, may be supplied to the vehicle control processor 16, for example, to the automatic driving controller 163 or any other unit to be described later, as illustrated in FIG. 1.

The vehicle control processor 16 may control various operations of the vehicle 1, and may perform various calculation processes, for example. For example, the vehicle control processor 16 may include one or more processors, i.e., a central processing unit (CPU), and one or more memories. The one or more processors may execute programs. The one or more memories may be communicably coupled to the one or more processors. The one or more memories may include, for example but not limited to, a random-access memory (RAM) and a read-only memory (ROM). The RAM may temporarily hold processing data. The ROM may hold programs.

In the example illustrated in FIG. 1, the vehicle control processor 16 may include the vehicle recognizer 161, a display controller 162, the automatic driving controller 163, and a battery controller 164. The automatic driving controller 163 may serve as a traveling controller.

The vehicle recognizer 161 may recognize another vehicle other than the vehicle 1 (an own vehicle), by performing a predetermined calculation process, such as an image recognition process, based on the captured images IR and IL each obtained by the stereo camera 13, i.e., obtained by the right camera and the left camera, respectively. For example, the vehicle recognizer 161 may recognize a preceding vehicle traveling in front of the vehicle 1 as the other vehicle.

The display controller 162 may control a display operation, i.e., an operation of displaying various kinds of information, performed by the information display unit 17, as illustrated in FIG. 1.

The automatic driving controller 163 may control a traveling operation of the vehicle 1. The automatic driving controller 163 may perform a comprehensive control related to traveling of the vehicle 1. For example, the automatic driving controller 163 may perform an automatic driving control of the vehicle 1. The automatic driving control may include, for example, an automatic control of a driving system, a braking system, and a steering system of the vehicle 1. In a predetermined case, the automatic driving controller 163 may cause transition from an automatic driving mode M1 to a manual driving mode M2 to be performed, in other words, may perform transfer of a driving mode. The automatic driving mode M1 may be a driving mode in which the automatic driving control is performed. The manual driving mode M2 may be a driving mode in which manual driving based on the operation received by the operation receiving unit 14 is performed.

Note that as used herein, the "automatic driving" may refer to advanced automatic driving of level 2, 3, or higher.

The automatic driving of level 2 may refer to automatic driving that achieves so-called "hands-off" driving. The automatic driving of level 3 may refer to automatic driving that achieves so-called "eyes-off" driving.

In the example illustrated in FIG. 1, such an automatic driving controller 163 may include an engine control unit 163a and a motor control unit 163b.

The engine control unit 163a may control various operations of the engine 10a, as illustrated in FIG. 1. The motor control unit 163b may control various operations of the motor 10b, as illustrated in FIG. 1. For example, the motor control unit 163b may control a driving operation of a wheel of the vehicle 1 performed by the motor 10b, a regenerative operation performed by the motor 10b, and any other operation.

The automatic driving controller 163 may also control the traveling operation of the vehicle 1 based on a recognition result related to another vehicle obtained by the vehicle recognizer 161 described above. The recognition result related to the other vehicle may include, for example, an inter-vehicle distance between the vehicle 1 and the other vehicle. For example, the automatic driving controller 163 may perform an automatic following control related to the other vehicle or a preceding vehicle, an automatic acceleration and deceleration control, or any other control by increasing and decreasing the inter-vehicle distance between the vehicle 1 and the other vehicle, the vehicle speed V described above, or any other factor. The automatic acceleration and deceleration control may refer to a control of automatic deceleration and automatic acceleration.

The battery controller 164 may perform various controls of the battery 11, including, without limitation, a charging control, as illustrated in FIG. 1.

Next, operations, workings, and example effects of the example embodiment will be described in detail, compared with those of comparative examples, i.e., Comparative examples 1 and 2.

Typically, when the above-described advanced automatic driving of level 2, 3, or higher is performed, hands-off or eyes-off automatic driving may be achieved, and a vehicle-led automatic driving state may be achieved. Upon such advanced automatic driving, in a predetermined case, the vehicle may sometimes request that the driver perform a temporary override or handover, i.e., may sometimes request a temporary operation by the driver. For example, such a temporary operation may include an operation accompanied by an actual driving operation as described below. In some cases, the vehicle may request that the driver simply give an instruction to the vehicle without performing such an actual operation or driving operation, as further described below.

A request for the operation accompanied by the driving operation may be made, for example, in a case where an automatic driving controller is not able to recognize a position of a lane line between traveling lanes, and therefore, a position of the vehicle is to be adjusted by the driving operation.

A request for simply giving an instruction may be made, for example, in a case where whether to turn left or travel straight at an intersection is to be decided based on an instruction given by the driver.

As described above, during the above-described advanced automatic driving, the occupant such as the driver may be to determine a situation of the vehicle or to perform an actual operation simply when the vehicle or the automatic driving controller asks that the occupant such as the driver perform a determination or an operation. However, under the above-described hands-off or eyes-off automatic driving situation, it can be difficult for the occupant such as the driver of the vehicle to immediately or intuitively recognize or operate an interface state of the operation receiving unit such as a steering wheel, an accelerator pedal, or a brake pedal, at the time. As a result, usability at the time of automatic driving can be degraded, for example, as described with reference to Comparative examples 1 and 2 below.

Figure 2:
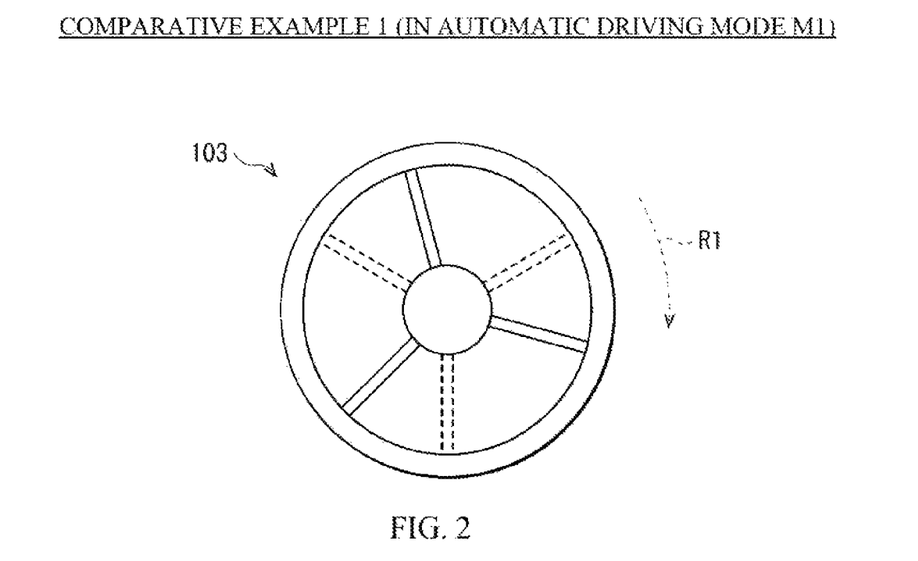
FIG. 2 is a schematic diagram illustrating a configuration example of a steering wheel in an automatic driving mode according to Comparative example 1.
Figure 3:
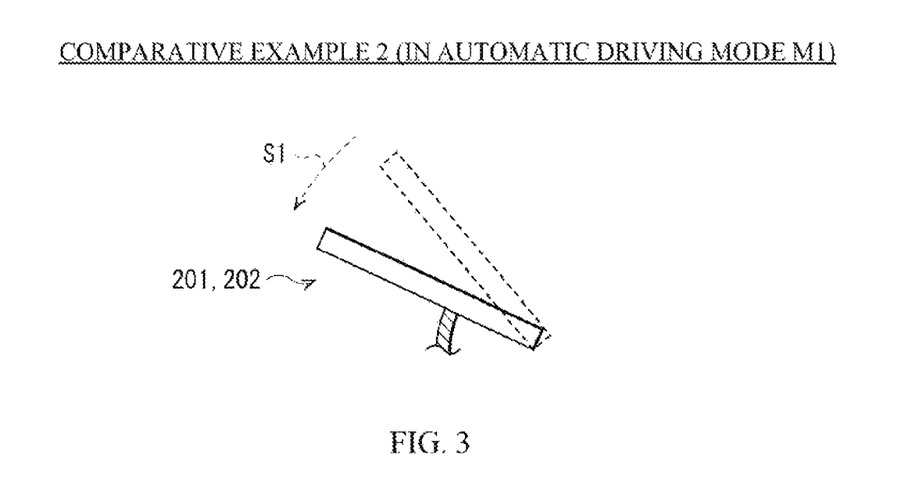
FIG. 3 is a schematic diagram illustrating a configuration example of each of an accelerator pedal and a brake pedal in the automatic driving mode according to Comparative example 2.

FIG. 2 schematically illustrates a configuration example of a steering wheel 103 in the automatic driving mode M1 according to Comparative example 1. FIG. 3 schematically illustrates a configuration example of each of an accelerator pedal 201 and a brake pedal 202 in the automatic driving mode M1 according to Comparative example 2. Note that the steering wheel 103 in FIG. 2 is represented by a schematic extracted illustration of a portion that is to be actually operated by the occupant such as the driver of the vehicle.

The steering wheel 103 of Comparative example 1 illustrated in FIG. 2 is in the following state, because the driving mode is set to the automatic driving mode M1. That is, an interface state of the steering wheel 103 is changed from a neutral state indicated by a dashed line to a state indicated by a solid line. The neutral state indicated by the dashed line is an initial state where a steering angle is 0°. The state indicated by the solid line is, for example, a state where the steering wheel 103 is rotated by the steering angle of 60°, as indicated by a dashed-line arrow R1. When the occupant of the vehicle is asked to perform a determination or an operation as described above, it can be difficult for the occupant of the vehicle to immediately recognize whether such an interface state of the steering wheel 103 is the interface state at the steering angle of 60°, the interface state at the steering angle of 420°, or the interface state at the steering angle of −120°.

The accelerator pedal 201 and the brake pedal 202 of Comparative example 2 illustrated in FIG. 3 are each in the following state because the driving mode is set to the automatic driving mode M1. That is, an interface state of each of the accelerator pedal 201 and the brake pedal 202 is changed from a neutral state indicated by a dashed line to a state indicated by a solid line. The neutral state indicated by the dashed line is an initial state where corresponding one of an accelerator position and a brake pressing amount is 0 (zero). The state indicated by the solid line is, for example, a state where corresponding one of the accelerator position and the brake pressing amount is increased to a state indicated by a dashed-line arrow S1. When the occupant of the vehicle is asked to perform a determination or an operation as described above, it can also be difficult for the occupant of the vehicle to immediately recognize the interface state of each of the accelerator pedal 201 and the brake pedal 202.

As described above, the operation receiving units of Comparative examples 1 and 2, i.e., the steering wheel 103, the accelerator pedal 201, and the brake pedal 202, can lead to the following situation when the vehicle asks that the occupant such as the driver perform a determination or an operation in the automatic driving mode M1. That is, in some cases, it can be difficult for the occupant of the vehicle to immediately or intuitively recognize the situation of the vehicle, i.e., the interface state of the operation receiving unit in the automatic driving mode M1, or to immediately or intuitively operate the operation receiving unit. As a result, it can be said that usability at the time of automatic driving can be degraded in Comparative examples 1 and 2.

In contrast, in the example embodiment, for example, in a no-operation period in which no operation on the operation receiving unit 14 is received, the interface state of the operation receiving unit 14 may be unchanged from the above-described neutral state, unlike in the above-described cases of Comparative examples 1 and 2. This is described with reference to Examples, i.e., Examples 1 and 2, below.

For example, the interface state of the operation receiving unit 14 may be unchanged from the neutral state at least in a period of transition (transfer) from the automatic driving mode M1 to the manual driving mode M2. However, in one example, the interface state of the operation receiving unit 14 may be unchanged from the neutral state substantially constantly, that is, also during the period of the automatic driving mode M1. In other words, the interface state of the operation receiving unit 14 may be set to the neutral state independently of the traveling state of the vehicle 1. In the example embodiment, the interface state of the operation receiving unit 14 may not unnecessarily be changed in such a manner (set aside a control such as a minimal risk maneuver (MRM)).

In one example, such setting of the neutral state of the operation receiving unit 14 may be setting in advance, that is, a static control. In another example, such setting of the neutral state of the operation receiving unit 14 may be setting at appropriately timings by the automatic driving controller 163, that is, a dynamic control.

Figure 4A:
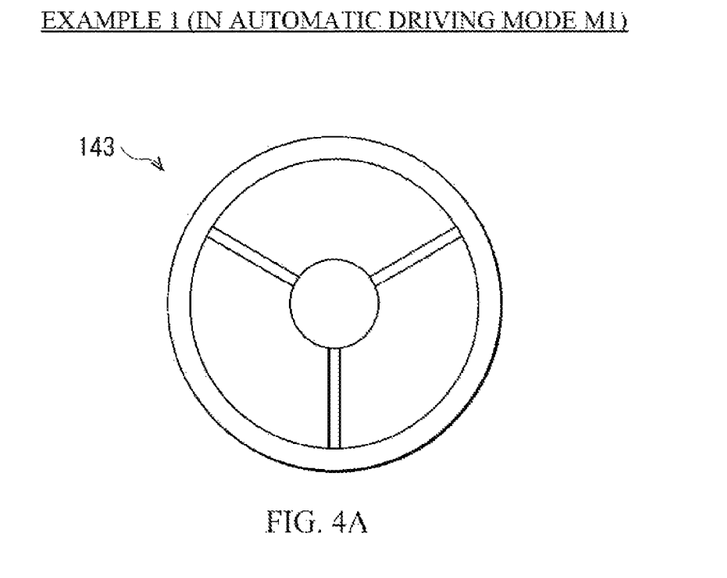
FIG. 4A is a schematic diagram illustrating a configuration example of a steering wheel in the automatic driving mode according to Example 1.
Figure 4B:
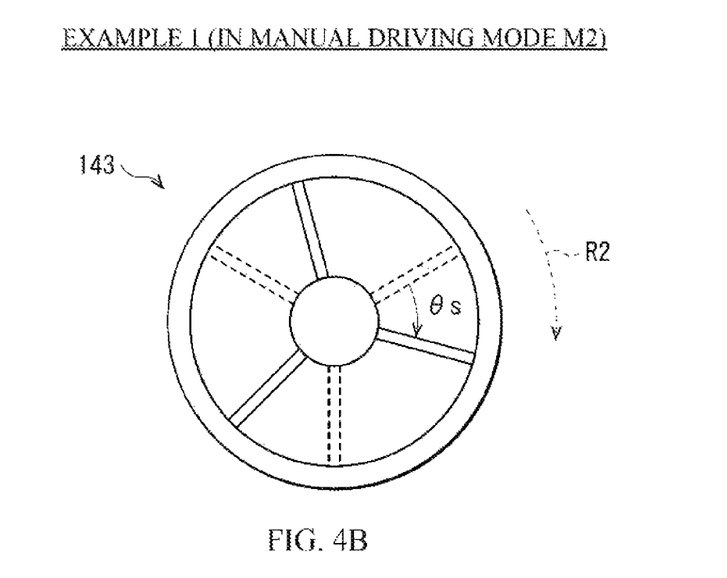
FIG. 4B is a schematic diagram illustrating a configuration example of the steering wheel in a manual driving mode according to Example 1.
Figure 5A:
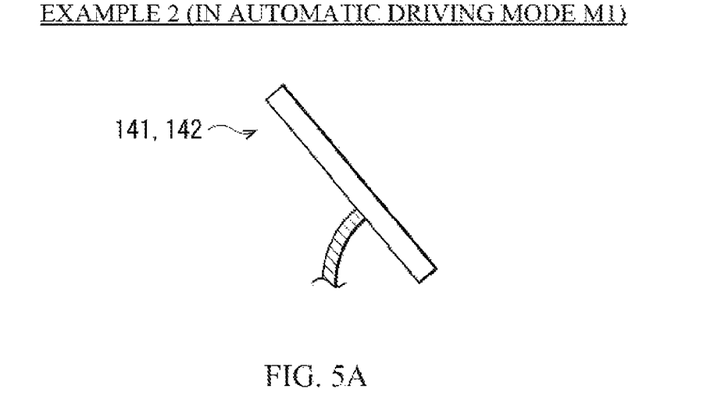
FIG. 5A is a schematic diagram illustrating a configuration example of each of an accelerator pedal and a brake pedal in the automatic driving mode according to Example 2.
Figure 5B:
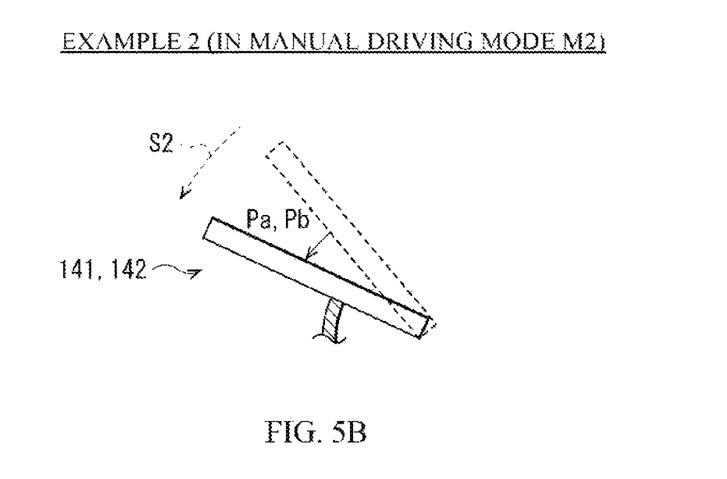
FIG. 5B is a schematic diagram illustrating a configuration example of each of the accelerator pedal and the brake pedal in the manual driving mode according to Example 2.

FIG. 4A schematically illustrates a configuration example of the steering wheel 143 in the automatic driving mode M1 according to Example 1. FIG. 4B schematically illustrates a configuration example of the steering wheel 143 in the manual driving mode M2 according to Example 1. FIG. 5A schematically illustrates a configuration example of each of the accelerator pedal 141 and the brake pedal 142 in the automatic driving mode M1 according to Example 2. FIG. 5B schematically illustrates a configuration example of each of the accelerator pedal 141 and the brake pedal 142 in the manual driving mode M2 according to Example 2. Note that the steering wheel 143 in each of FIGS. 4A and 4B is represented by a schematic extracted illustration of a portion that is to be actually operated by the occupant such as the driver of the vehicle 1.

The steering wheel 143 of Example 1 illustrated in FIG. 4A may be in the following state at the time of the automatic driving mode M1 that is the above-described no-operation period. That is, an interface state of the steering wheel 143 may be unchanged from a neutral state that is an initial state where a steering angle is 0°. In other words, although a predetermined steering angle is, in fact, set (e.g., turning by 60° to the left is performed) by the automatic driving control performed by the automatic driving controller 163, the interface state of the steering wheel 143 may still be set to the neutral state.

The accelerator pedal 141 and the brake pedal 142 of Example 2 illustrated in FIG. 5A may each be in the following state at the time of the automatic driving mode M1 that is the above-described no-operation period. That is, an interface state of each of the accelerator pedal 141 and the brake pedal 142 may be unchanged from a neutral state that is an initial state where corresponding one of the accelerator position Pa and the brake pressing amount Pb is 0 (zero). In other words, although corresponding one of a predetermined accelerator position and a predetermined brake pressing amount is, in fact, set by the automatic driving control performed by the automatic driving controller 163, the interface state of each of the accelerator pedal 141 and the brake pedal 142 may still be set to the neutral state.

In contrast, the following may happen after the transition (the transfer) from the automatic driving mode M1 to the manual driving mode M2 is performed in the example embodiment. That is, for example, as in Examples 1 and 2 described below, the interface state of the operation receiving unit 14 may be changed from the above-described neutral state in accordance with an amount of an operation performed on the operation receiving unit 14, that is, an amount of an actual operation, on the operation receiving unit 14, performed by the occupant such as the driver of the vehicle 1.

The steering wheel 143 of Example 1 illustrated in FIG. 4B may be in the following state when an operation is performed on the steering wheel 143 by the occupant such as the driver after the transition to the manual driving mode M2 is performed, for example, as indicated by a dashed-line arrow R2. That is, the interface state of the steering wheel 143 may be changed from the neutral state indicated by a dashed line to a state indicated by a solid line in accordance with the amount of the operation performed on the steering wheel 143, i.e., the steering angle θs. The state indicated by the solid line may be a state in which the steering wheel 143 is rotated by the steering angle θs. For example, when the occupant such as the driver of the vehicle 1 wants to move the vehicle 1 further to the left but the current turning amount of the vehicle 1 is insufficient to achieve the situation that the occupant such as the driver wishes, the occupant such as the driver of the vehicle 1 may actually operate the steering wheel 143, which may result in the following situation. That is, for example, when the steering angle or the turning angle in the automatic driving mode M1 is set to 60°, and when the amount of the operation after the transition to the manual driving mode M2 is performed is 20°, the turning amount of the vehicle 1 as a whole may be equivalent to 80° (=60°+20°).

The accelerator pedal 141 and the brake pedal 142 of Example 2 illustrated in FIG. 5B may each be in the following state when an operation is performed on corresponding one of the accelerator pedal 141 and the brake pedal 142 by the occupant such as the driver after the transition to the manual driving mode M2 is performed, for example, as indicated by a dashed-line arrow S2. That is, the interface state of each of the accelerator pedal 141 and the brake pedal 142 may be changed from the neutral state indicated by a dashed line to a state indicated by a solid line in accordance with the amount of the operation performed on corresponding one of the accelerator pedal 141 and the brake pedal 142, i.e., corresponding one of the accelerator position Pa and the brake pressing amount Pb. The state indicated by the solid line may be a state in which corresponding one of the accelerator position Pa and the brake pressing amount Pb is increased to be greater than 0 (zero).

Figure 6:
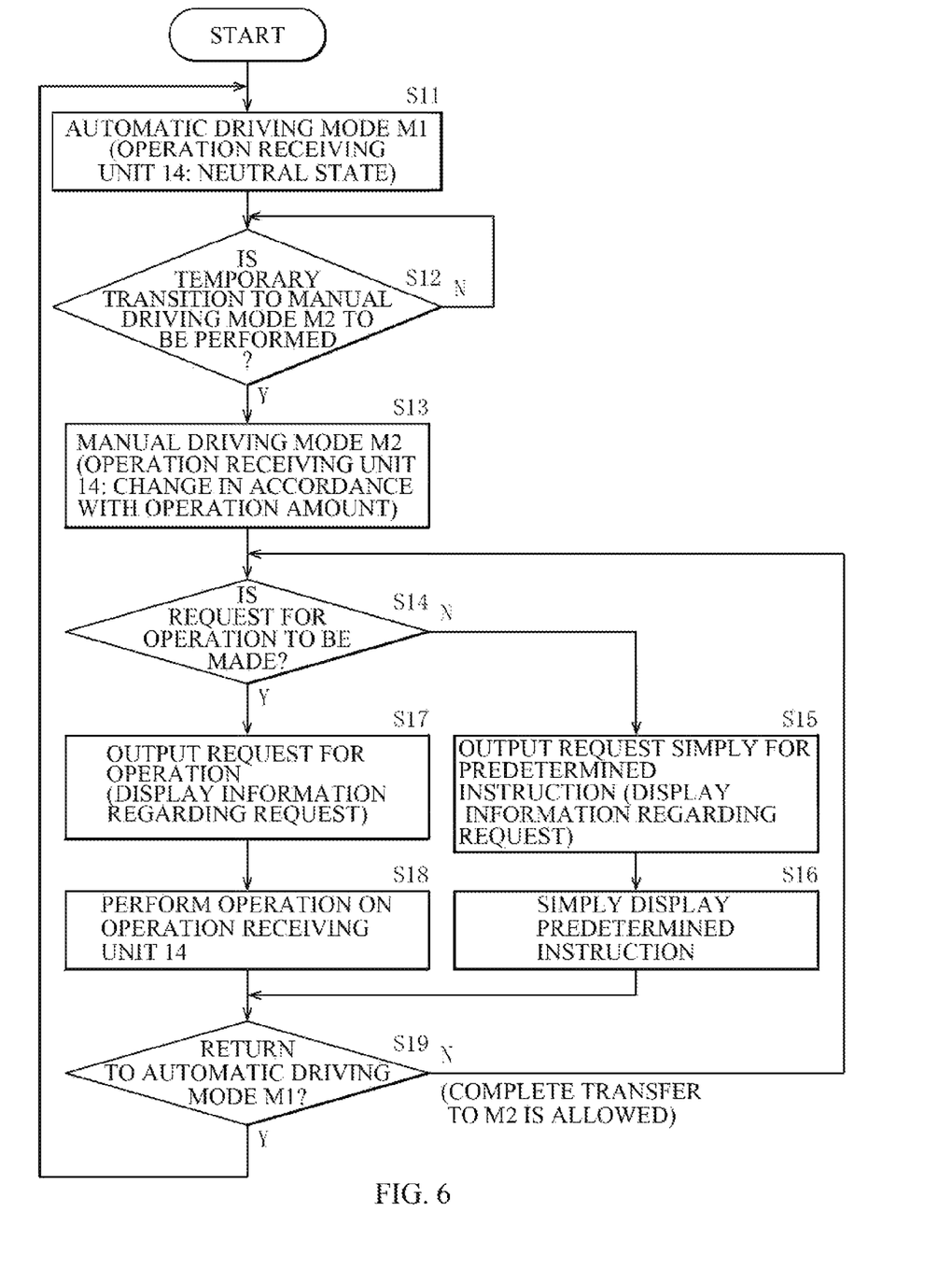
FIG. 6 is a flowchart illustrating an example of a vehicle control process according to Examples 1 and 2.

Next, a detailed description is given of an example of a vehicle control process according to Examples 1 and 2 of the example embodiment, with reference to FIGS. 1, 4A, 4B, 5A, and 5B, and also to FIG. 6. FIG. 6 illustrates an example of the vehicle control process according to Examples 1 and 2 in a flowchart.

In the vehicle control process illustrated in FIG. 6, first, when the driving mode of the vehicle 1 is set to the automatic driving mode M1 by the automatic driving controller 163, the interface state of the operation receiving unit 14 may be set to the above-described neutral state (step S11). Thereafter, the automatic driving controller 163 may perform a determination as to whether temporary transition from the automatic driving mode M1 to the manual driving mode M2 is to be performed, as described above (step S12). If the automatic driving controller 163 determines that the temporary transition to the manual driving mode M2 is not to be performed (step S12: N), the automatic driving controller 163 may perform the determination in step S12 again.

If the automatic driving controller 163 determines that the temporary transition to the manual driving mode M2 is to be performed (step S12: Y), the automatic driving controller 163 may set the driving mode of the vehicle 1 to the manual driving mode M2, thus causing the temporary transition from the automatic driving mode M1 to the manual driving mode M2 to be performed (step S13). Note that in the manual driving mode M2, the interface state of the operation receiving unit 14 may be changed from the neutral state in accordance with the amount of the operation performed on the operation receiving unit 14, as described above.

Thereafter, the automatic driving controller 163 may perform a determination as to whether the above-described request (asking) for an operation is to be made, in other words, whether the above-described request simply for an instruction is enough (step S14). If the automatic driving controller 163 determines that such a request for an operation is not to be made (step S14: N), the request simply for a predetermined instruction may be outputted for the occupant such as the driver of the vehicle 1 (step S15). For example, in accordance with a display control performed by the display controller 162, the information display unit 17 may display information that requests performance of giving the predetermined instruction, and the occupant such as the driver of the vehicle 1 may simply give the predetermined instruction (step S16). Thereafter, the process may proceed to step S19 which will be described later.

If the automatic driving controller 163 determines that the above-described request for an operation is to be made (step S14: Y), such a request for an operation may be outputted for the occupant such as the driver of the vehicle 1 (step S17). For example, in accordance with a display control performed by the display controller 162, the information display unit 17 may display information that requests performance of an operation on the operation receiving unit 14, and the occupant such as the driver of the vehicle 1 may perform the operation on the operation receiving unit 14 (step S18). Thereafter, the process may proceed to step S19 described below.

In step S19, the automatic driving controller 163 may perform a determination as to whether a return from the manual driving mode M2 to the automatic driving mode M1 is allowed, in other words, whether a return from the above-described temporary transition is to be performed. If the automatic driving controller 163 determines that the return to the automatic driving mode M1 is allowed (step S19: Y), the process may return to step S11 described above, i.e., to the setting of the driving mode to the automatic driving mode M1. If the automatic driving controller 163 determines that the return to the automatic driving mode M1 is not allowed (step S19: N), the process may return to step S14 described above, i.e., to the performing of the determination as to whether a request for an operation is to be made. Note that, in one example, if the automatic driving controller 163 determines that the return to the automatic driving mode M1 is not allowed as described above, the automatic driving controller 163 may set the driving mode to be completely transferred to the manual driving mode M2 thereafter, as illustrated in FIG. 6.

This is the end of the description regarding the series of processes illustrated in FIG. 6, i.e., the vehicle control process according to Examples 1 and 2.

As described above, in the example embodiment, the interface state of the operation receiving unit 14 is unchanged from the neutral state in the no-operation period in which the operation on the operation receiving unit 14 is not received. For example, the interface state of the operation receiving unit 14 may be unchanged from the neutral state at least in the period of the transition from the automatic driving mode M1 to the manual driving mode M2.

Accordingly, in the example embodiment, for example, when the vehicle 1 or the automatic driving controller 163 asks that the occupant such as the driver perform a determination or an operation, the following may happen. That is, also when such asking is performed, unlike Comparative examples 1 and 2 described above and the like, it is possible to allow the occupant of the vehicle 1 to intuitively recognize the situation of the vehicle 1, i.e., the interface state of the operation receiving unit 14 in the automatic driving mode M1. As a result, the example embodiment makes it possible to improve usability at the time of automatic driving.

For example, the time may be shortened for the driver of the vehicle 1 to recognize the situation of the vehicle 1 by looking at or touching the interface state of the operation receiving unit 14. For example, the widespread use of the automatic driving control can lead to a degradation of the driver's driving skill in the future. However, the above-described decrease in time for the driver of the vehicle 1 to recognize the situation of the vehicle 1 helps to deal with such a degradation of the driver's driving skill. That is, for example, a special action to deal with the degradation in the driver's driving skill may not be provided. This helps to reduce control bugs and also to reduce costs.

In addition, in the example embodiment, after the transition from the automatic driving mode M1 to the manual driving mode M2 is performed, the interface state of the operation receiving unit 14 may be changed from the neutral state in accordance with the amount of the operation performed on the operation receiving unit 14, as described above. This allows for the following. That is, after such transition to the manual driving mode M2 is performed, the interface state may be changed from the neutral state in accordance with the amount of the actual operation performed on the operation receiving unit 14, i.e., the amount of manual operation performed on the operation receiving unit 14. This allows the occupant such as the driver of the vehicle 1 to intuitively recognize the amount of the actual operation, making it possible to further improve the usability at the time of the automatic driving.

Although some example embodiments and Examples of the disclosure are described above, the disclosure is not limited to those example embodiments and Examples, and is modifiable in a variety of ways.

For example, the configurations, including, without limitation, types, shapes, arrangements, or the numbers of pieces, of the respective members of the vehicle 1, the operation receiving unit 14, the vehicle control processor 16, and any other component are not limited to those described in the foregoing example embodiments and Examples. Regarding the respective configurations of the above-described members, an alternative example embodiment may employ types, shapes, arrangements, the numbers of pieces, etc., other than those described with reference to the foregoing example embodiments and Examples. In addition, values, ranges, magnitude relationships, etc., of the various parameters described in the foregoing example embodiments and Examples are illustrative and non-limiting. An alternative example embodiment may employ other values, ranges, magnitude relationships, etc.

For example, although in the foregoing example embodiments and Examples, the accelerator pedal 141, the brake pedal 142, and the steering wheel 143 may be referred to as examples of the operation receiving unit 14, the operation receiving unit 14 is not limited to these members. That is, the operation receiving unit 14 may include, for example but not limited to, a gear shift lever, a signal light or a turn signal lamp, or any other member in addition to or in place of the above-described members.

For example, although in the foregoing example embodiments and Examples, some examples may be referred to in relation to various processes to be performed by the vehicle 1, the operation receiving unit 14, the vehicle control processor 16, and any other component, the processes are not limited to the above-described examples. That is, the processes may be executed by any other method.

Further, the series of processes described in the foregoing example embodiments and Examples may be performed by hardware such as a circuit, or software such as a program. In an example embodiment where the processes are performed by software, the software may include a group of programs that causes a computer to execute respective operations. Each of the programs may be incorporated in the computer in advance, or may be installed on the computer via a network or a computer readable recording medium.

In addition, although the foregoing example embodiments and Examples may be described with reference to the example case where the vehicle 1 includes one motor, i.e., the motor 10b, the example case is non-limiting. That is, for example, the vehicle 1 may include two or more motors. Further, although the foregoing example embodiments and Examples may be described with reference to the vehicle 1 configured as an HEV, this example is not limiting. That is, for example, one embodiment of the disclosure is applicable also to a vehicle configured as an electric vehicle (EV) or a gasoline-fueled vehicle.

Furthermore, the various examples described above may be applied in any combination.

The example effects described herein are merely illustrative and non-limiting. Any example embodiment may achieve an effect other than the example effects described above.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, one embodiment of the disclosure may have any of the following configurations.

(1)

A vehicle control system including:
an operation receiving unit configured to receive an operation at least through an electrical signal, the operation being to be performed by an occupant of a vehicle; and
an automatic driving control processor configured to perform an automatic driving control of the vehicle, and cause transition from an automatic driving mode to a manual driving mode to be performed in a predetermined case, the automatic driving mode being a driving mode in which the automatic driving control is performed, the manual driving mode being a driving mode in which manual driving based on the operation received by the operation receiving unit is performed, in which
the operation receiving unit has an interface state configured to be unchanged from a neutral state in a no-operation period in which the operation on the operation receiving unit is not received.

(2)

The vehicle control system according to (1) described above, in which the interface state of the operation receiving unit is configured to be set to the neutral state at least in a period of the transition from the automatic driving mode to the manual driving mode.

(3)

The vehicle control system according to (1) or (2) described above, in which the interface state of the operation receiving unit is configured to be set to the neutral state independently of a traveling state of the vehicle.

(4)

The vehicle control system according to any one of (1) to (3) described above, in which the interface state of the operation receiving unit is configured to, after the transition from the automatic driving mode to the manual driving mode is performed, be changed from the neutral state in accordance with an amount of the operation performed on the operation receiving unit.

(5)

The vehicle control system according to any one of (1) to (4) described above, further including
an information output unit configured to output predetermined information, in which
the information output unit is configured to output information requesting performance of the operation on the operation receiving unit in the predetermined case.

(6)

A vehicle including
a vehicle control system including
an operation receiving unit configured to receive an operation at least through an electrical signal, the operation being to be performed by an occupant of the vehicle, and
an automatic driving control processor configured to perform an automatic driving control of the vehicle, and cause transition from an automatic driving mode to a manual driving mode to be performed in a predetermined case, the automatic driving mode being a driving mode in which the automatic driving control is performed, the manual driving mode being a driving mode in which manual driving based on the operation received by the operation receiving unit is performed, in which
the operation receiving unit has an interface state configured to be unchanged from a neutral state in a no-operation period in which the operation on the operation receiving unit is not received.

The vehicle control processor 16 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle control processor 16 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle control processor 16 illustrated in FIG. 1.

The invention claimed is:

1. A vehicle control system comprising:
an automatic driving control processor configured to perform an automatic driving control of a vehicle, and cause a transition from an automatic driving mode to a manual driving mode to be performed in a predetermined case, the automatic driving mode being a driving mode in which the automatic driving control is performed, the manual driving mode being a driving mode in which manual driving is performed, wherein
the automatic driving control processor is further configured to:
set an interface state of an operation receiving unit of the vehicle to a neutral state in a predetermined period of the transition from the automatic driving mode to the manual driving mode, the operation receiving unit being configured to receive an operation to be performed by an occupant of the vehicle.

2. The vehicle control system according to claim 1, wherein the automatic driving control processor is configured to set the interface state of the operation receiving unit to the neutral state independently of a traveling state of the vehicle.

3. The vehicle control system according to claim 2, wherein the automatic driving control processor is configured to change the interface state of the operation receiving unit from the neutral state, after the transition from the automatic driving mode to the manual driving mode is performed, to a state that changes in accordance with an amount of the operation performed on the operation receiving unit.

4. The vehicle control system according to claim 2, further comprising
an information output unit comprising a display, configured to output predetermined information, wherein
the information output unit is configured to output information requesting performance of the operation on the operation receiving unit in the predetermined case.

5. The vehicle control system according to claim 1, wherein the automatic driving control processor is configured to change the interface state of the operation receiving unit from the neutral state, after the transition from the automatic driving mode to the manual driving mode is performed, to a state that changes in accordance with an amount of the operation performed on the operation receiving unit.

6. The vehicle control system according to claim 1, further comprising
an information output unit comprising a display, configured to output predetermined information, wherein
the information output unit is configured to output information requesting performance of the operation on the operation receiving unit in the predetermined case.

7. The vehicle control system according to claim 1, wherein the automatic driving control processor is further configured to set the interface state of the operation receiving unit to the neutral state in a no-operation period in which the operation on the operation receiving unit is not received.

8. The vehicle control system according to claim 1, wherein the automatic driving control processor is further configured to set the interface state of the operation receiving unit to the neutral state during the automatic driving mode.

9. The vehicle control system according to claim 1, wherein the operation receiving unit is at least one of an accelerator pedal, a brake pedal, a steering wheel, a gear shift lever, a signal light, or a turn signal lamp.

10. The vehicle control system according to claim 1, wherein the automatic driving control processor is configured to:
change the interface state of the operation receiving unit from the neutral state, after the transition from the automatic driving mode to the manual driving mode is performed, to a state that changes in accordance with an amount of the operation performed on the operation receiving unit, and
perform a vehicle control depending on the amount of the operation that has changed from the neutral state.

11. A vehicle comprising
a vehicle control system comprising
an automatic driving control processor configured to perform an automatic driving control of the vehicle, and cause a transition from an automatic driving mode to a manual driving mode to be performed in a predetermined case, the automatic driving mode being a driving mode in which the automatic driving control is performed, the manual driving mode being a driving mode is performed, wherein
the automatic driving control processor is further configured to:
set an interface state of an operation receiving unit of the vehicle to a neutral state in a predetermined period of the transition from the automatic driving mode to the manual driving mode, the operation receiving unit being configured to receive an operation to be performed by an occupant of the vehicle.

12. The vehicle control system according to claim 11, wherein the automatic driving control processor is further configured to set the interface state of the operation receiving unit to the neutral state in a no-operation period in which the operation on the operation receiving unit is not received.

13. The vehicle control system according to claim 11, wherein the automatic driving control processor is further configured to set the interface state of the operation receiving unit to the neutral state during the automatic driving mode.

14. The vehicle control system according to claim 11, wherein the operation receiving unit is at least one of an accelerator pedal, a brake pedal, a steering wheel, a gear shift lever, a signal light, or a turn signal lamp.

15. The vehicle control system according to claim 11, wherein the automatic driving control processor is configured to:
change the interface state of the operation receiving unit from the neutral state, after the transition from the automatic driving mode to the manual driving mode is performed, to a state that changes in accordance with an amount of the operation performed on the operation receiving unit, and perform a vehicle control depending on the amount of the operation that has changed from the neutral state.

\* \* \* \* \*